(12) United States Patent
Blum

(10) Patent No.: US 7,669,291 B1
(45) Date of Patent: Mar. 2, 2010

(54) MAGNETIC HOLDER

(76) Inventor: Alvin S. Blum, 2350 Del Mar Pl., Fort Lauderdale, FL (US) 33301

( * ) Notice: Subject to any disclaimer, the term of this patent is extended or adjusted under 35 U.S.C. 154(b) by 0 days.

(21) Appl. No.: 12/231,282

(22) Filed: Sep. 2, 2008

(51) Int. Cl.
*A47J 45/00* (2006.01)
*A45C 13/26* (2006.01)
(52) U.S. Cl. .......................................... 16/435; 16/425
(58) Field of Classification Search ................. 16/425, 16/435; 294/25, 171, 137, 149, 170, 147; 2/20, 16, 158, 167, 168; 248/467
See application file for complete search history.

(56) References Cited

U.S. PATENT DOCUMENTS

| 1,637,120 | A | * | 7/1927 | Larson | ........................... 38/95 |
| 2,042,255 | A | * | 5/1936 | Haas | ........................... 15/220.4 |
| 2,641,793 | A | * | 6/1953 | Wilm | ........................... 16/435 |
| 2,645,776 | A | * | 7/1953 | Kiler | ........................... 16/435 |
| 5,600,855 | A | | 2/1997 | Ramirez | |
| 5,638,955 | A | * | 6/1997 | Calciano | ........................... 206/320 |
| 5,979,673 | A | | 11/1999 | Dooley | |
| 6,112,372 | A | | 9/2000 | Zhou | |
| 6,279,168 | B1 | | 8/2001 | Bean | |
| 6,378,925 | B1 | * | 4/2002 | Greenlee | ........................... 294/171 |
| 7,117,536 | B2 | * | 10/2006 | Burnett et al. | ........................... 2/16 |
| 2003/0131447 | A1 | * | 7/2003 | Mikus | ........................... 16/422 |
| 2003/0155785 | A1 | * | 8/2003 | Kitagawa et al. | ........................... 294/15 |
| 2005/0177983 | A1 | | 8/2005 | Holms | |
| 2007/0000089 | A1 | * | 1/2007 | Morales | ........................... 16/114.1 |

FOREIGN PATENT DOCUMENTS

CA 2257684 A1 * 7/1999

* cited by examiner

*Primary Examiner*—Chuck Y. Mah
(74) *Attorney, Agent, or Firm*—Alvin S. Blum

(57) ABSTRACT

The invention is a pot holder that will insulate the hand from heat, have adequate friction for holding, and be readily available and usable with one hand. The holder or handgrip of the invention comprises an elastomer sheet such as silicone rubber with a small permanent magnet affixed adjacent one edge. The magnet has sufficient attractive force to support the holder in place against a ferromagnetic surface such as the vertical side of a refrigerator or microwave oven, for example. In an alternative embodiment of the invention, a small piece of ferromagnetic material may be affixed to an opposite edge of the sheet to removably attach to the magnet on the opposite edge to thereby form the sheet into a tube that may be used to removably attach to a handle. The sheet may have one or both broad surfaces provided with a texture to enhance friction to provide a non-slip surface. The sheet has sufficient insulating properties to protect a hand from a hot handle. It has sufficient surface friction properties to provide a good grip on a pot or jar.

12 Claims, 1 Drawing Sheet

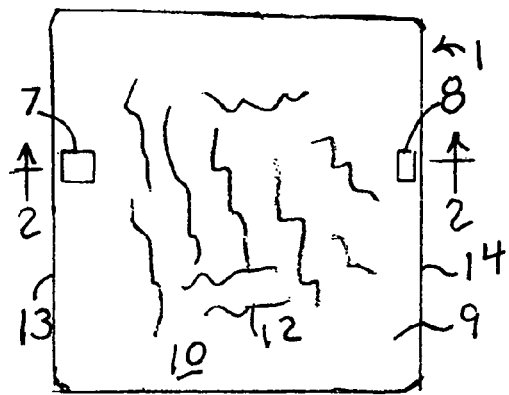
FIG. 1
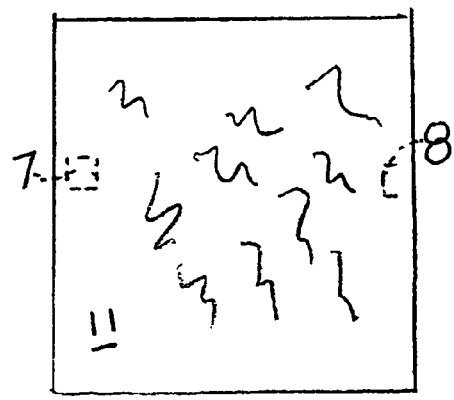
FIG. 3
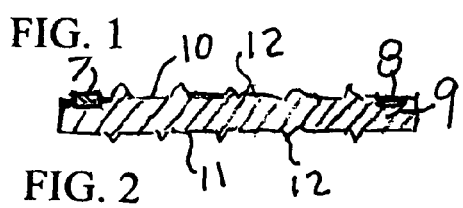
FIG. 2
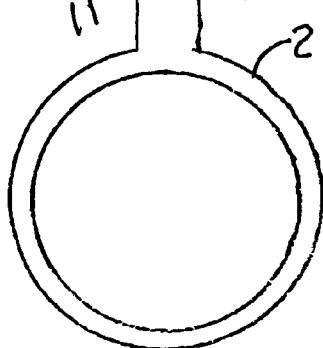
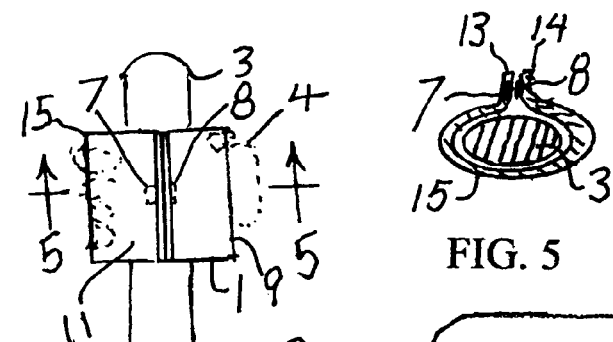
FIG. 5
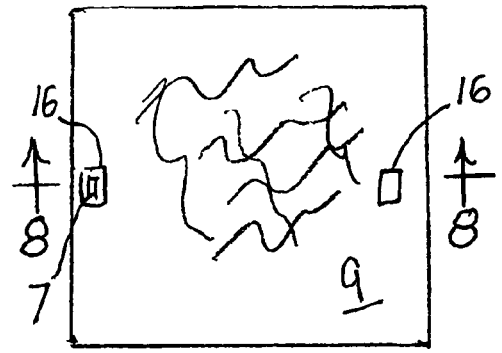
FIG. 7
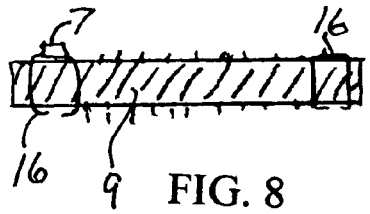
FIG. 8
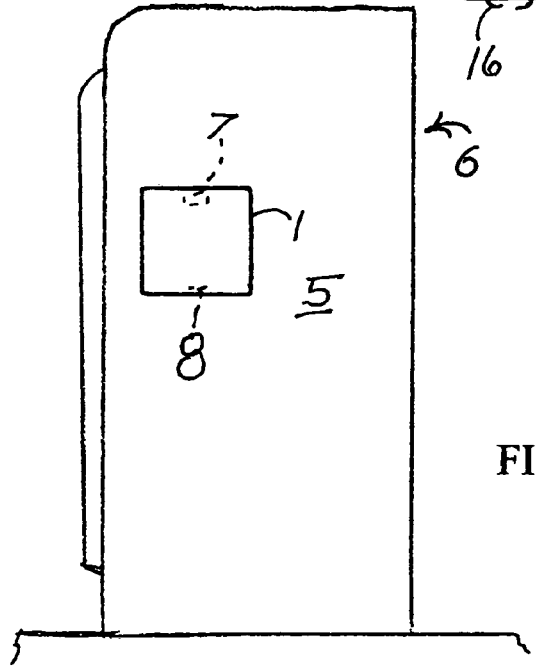
FIG. 4
FIG. 6

MAGNETIC HOLDER

FIELD OF THE INVENTION

This invention relates generally to kitchen handgrips operable with one hand for grasping items, and more particularly to an insulating elastomeric sheet having a magnet attached to one edge with sufficient power to hold the sheet against a ferromagnetic support structure for readily accessible storage.

BACKGROUND OF THE INVENTION

Pot holders of laminated fabric are well known for grasping hot handles such as those on cast iron skillets and metal pots. They are exemplified by U.S. Pat. No. 6,112,372 issued Sep. 5, 2000 to Zhou et al. Holmes in U.S. Patent application 2005/0177983 of Aug. 18, 2005 teaches a surface treated elastomeric sheet laminated to a fabric with opposing edges that removably fasten together with hook and loop fasteners to form a tubular handgrip. Silicone rubber gloves are well known for protecting hands from hot pans. These items must be stored somewhere when not in use. Cooks often grasp a towel for use because it is more convenient that finding a suitable pot holder, or putting on a glove.

SUMMARY OF THE INVENTION

It is accordingly an object of the invention to provide a pot holder that will insulate the hand from heat, have adequate friction for holding, and be readily available and usable with one hand. The holder or handgrip of the invention comprises an elastomer sheet with a small permanent magnet affixed to one edge. The magnet has sufficient attractive force to support the holder against a ferromagnetic surface such as the vertical side of a refrigerator or microwave oven, for example. In an alternative embodiment of the invention, a small piece of ferromagnetic material may be affixed to an opposite edge of the sheet to removably attach to the magnet on the opposite edge to thereby form the sheet into a tube that may be used to removably attach to a handle. The sheet may have one or both broad surfaces provided with a texture to enhance friction to provide a non-slip surface. The sheet has sufficient insulating properties to protect a hand from a hot handle. It has sufficient surface friction properties to provide a good grip on a pot or jar.

These and other objects, features, and advantages of the invention will become more apparent from the detailed description of an exemplary embodiment thereof as illustrated in the accompanying drawings, in which like elements are designated by like reference characters in the various drawing figures.

BRIEF DESCRIPTION OF THE DRAWINGS

FIG. 1 is a top view of a holder of the invention.

FIG. 2 is a sectional view through line 2-2 of FIG. 1.

FIG. 3 is bottom view of the invention of FIG. 1.

FIG. 4 is a top view of the invention on a skillet handle.

FIG. 5 is a sectional view through line 5-5 of FIG. 4.

FIG. 6 is a side elevation view of a refrigerator with the holder stored thereon.

FIG. 7 is a top view of another embodiment of the invention.

FIG. 8 is a sectional view through line 8-8 of FIG. 7.

DETAILED DESCRIPTION OF PREFERRED EMBODIMENTS

Referring now first to the drawing FIGS. 1-6, a pot holder 1 of the invention is a sheet 9 of elastomer that has broad first surface 10 and opposed broad second surface 11. The sheet has sufficient thickness and insulating properties to enable a user to briefly grasp a hot article such as the hot metal skillet 2 with the sheet 9 between the hand 4 and the metal handle 3. A permanent magnet 7 is affixed to the first surface 10 adjacent the first edge 13. The magnet has sufficient attractive force to enable it to support the device on the vertical wall of a ferromagnetic structure such as an oven or the enameled steel wall 5 of the refrigerator 6 shown in FIG. 6. One or both of the broad surfaces 10, 11 may be provided with a textured surface 12 to enhance the gripping power of the device. This will be especially helpful when a pair of the devices is used to open a screw cap jar. The rubbery nature of the sheet 9 along with the textured surface enhances the many gripping functions for which the device may be employed. By being able to store the device where it can be readily seen and removed with one hand as needed, the device will be easier to use. The elastomer sheet may be silicone rubber or polyurethane rubber, for example. This device will lay flat on a table to serve as a trivet. These materials are available in heat and chemical resistant form for stability and easy cleaning.

A ferromagnetic element 8, such as a thin steel plate may be affixed to the first surface adjacent an opposed second edge 14. Alternatively, the element 8 may be affixed to the second surface 11 adjacent the second edge 14. When the magnet 7 and element 8 are juxtaposed, they will adhere together, forming a tubular structure of a predetermined diameter, the diameter being determined by the distance between elements 7 and 8 which is equal to the circumference of the tube at the elements, as shown in FIG. 5. This tubular form 15 may be used to temporarily attach the device to an article. As shown in FIGS. 4 and 5, the tubular form 15 is held on the metal handle 3 of a cast iron skillet 2 to protect the hand 4 from the hot handle. The hand may be removed and the tube 15 will remain in place. The tubular form of the device may enable the device to be stored on the rod handle of many ovens for convenient access. The element 8 may be replaced with another permanent magnet if desired. In a preferred embodiment, the magnet 7 and element 8 are molded into the sheet at the time the sheet is formed. Alternatively, the magnet 7 and/or the element 8 may be affixed to the sheet 9 after it is formed by means well known in the art such as cementing.

Referring now to FIGS. 7 and 8, another embodiment of the invention is shown in which carriers 16 such as steel staples are affixed to the already formed sheet 9. The permanent magnet 7 is then affixed to one of the staples by adhesive means.

The position and dimensions of the magnet 7 will affect the operation of the device. It has been found that preferred dimensions of the magnet are less than ½ inch square and 1/16 inch thick. The position is preferably about mid way alongside an edge. This keeps the magnet away from a corner where it is more likely to inadvertently engage a metal object. In the tubular configuration, it keeps the closure at the grasping hand. When the magnet and ferromagnetic element are on the same broad face of the sheet, a user can remove the holder from its storage position on the side of a refrigerator and form it into a tube on a handle with one hand while the other hand is not available.

While I have shown and described preferred embodiments of my invention, it will be understood that the invention may be embodied otherwise than as herein specifically illustrated or described, and that certain changes in form and arrangement of parts and the specific manner of practicing the invention may be made within the underlying idea or principles of the invention.

What is claimed is:

1. A device for grasping a hot article with one hand, the device comprising:
    an elastomer sheet having broad first and second surfaces, opposite edges, and insulating properties to reduce heat transmission between the two broad surfaces sufficient to enable a hand to briefly grasp the article with the sheet therebetween;
    a permanent magnet incorporated into the first broad surface of the sheet adjacent a first edge, the magnet having sufficient attractive power to hold the sheet in place against a vertical ferromagnetic surface;
    a ferromagnetic element affixed to the sheet adjacent an edge opposite to the first edge; and the sheet constructed to form a tubular structure of predetermined diameter when the magnet and ferromagnetic element are juxtaposed.

2. The device of claim 1 in which the permanent magnet and ferromagnetic element are molded into the sheet.

3. The device of claim 1, in which the permanent magnet is molded into the sheet.

4. The device of claim 1, in which the permanent magnet is affixed to a carrier which is affixed to the sheet.

5. The device of claim 1, in which at least one broad surface is textured to enhance friction.

6. A pot holder comprising:
    a silicone rubber sheet having opposed broad first and second faces and narrow opposed edges;
    a permanent magnet incorporated into the first broad face adjacent a first narrow edge;
    the permanent magnet having sufficient magnetic holding power to hold the pot holder in place against a vertical ferromagnetic surface;
    a ferromagnetic element incorporated into a broad face adjacent an opposed second narrow edge; and the sheet constructed to form a tubular structure of predetermined diameter when the permanent magnet and ferromagnetic element are juxtaposed to thereby attach the sheet to an article handle.

7. The pot holder of claim 6, in which at least one broad face is textured to enhance friction.

8. The pot holder of claim 6, in which the ferromagnetic element is on the first broad face to thereby enable a user to remove the pot holder from a vertical storage and form the tubular structure with one hand.

9. A pot holder comprising:
    an elastomer sheet having opposed broad first and second faces and narrow opposed edges;
    a first permanent magnet affixed onto the first broad face adjacent a first narrow edge;
    a second permanent magnet affixed onto a broad face adjacent an opposed second narrow edge;
    the pot holder constructed to form a tubular structure of a predetermined diameter when both permanent magnets are juxtaposed to thereby attach the sheet to an article handle; and
    the magnets having sufficient magnetic holding power to hold the pot holder in place against a vertical ferromagnetic surface.

10. The pot holder of claim 9, in which at least one broad face is textured to enhance friction.

11. The pot holder of claim 9, in which both permanent magnets are on the first broad face to thereby enable a user to remove the pot holder from a vertical storage and form the tubular structure with one hand.

12. The pot holder of claim 9 in which the permanent magnets are affixed to a carrier which is affixed to the sheet.

* * * * *